United States Patent
LaDuke et al.

(10) Patent No.: US 9,526,156 B2
(45) Date of Patent: Dec. 20, 2016

(54) SYSTEM AND METHOD FOR THEATRICAL FOLLOWSPOT CONTROL INTERFACE

(75) Inventors: Thomas F. LaDuke, Orange, CA (US); Robert Scott Trowbridge, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1165 days.

(21) Appl. No.: 12/800,615

(22) Filed: May 18, 2010

(65) Prior Publication Data

US 2011/0285854 A1 Nov. 24, 2011

(51) Int. Cl.
| | |
|---|---|
| H04N 5/225 | (2006.01) |
| H05B 37/02 | (2006.01) |
| G01S 11/00 | (2006.01) |
| G02B 26/08 | (2006.01) |
| G05D 25/00 | (2006.01) |

(52) U.S. Cl.
CPC ............ *H05B 37/029* (2013.01); *G01S 11/00* (2013.01); *G02B 26/08* (2013.01); *G05D 25/00* (2013.01)

(58) Field of Classification Search
USPC ......................................................... 348/169
See application file for complete search history.

(56) References Cited

U.S. PATENT DOCUMENTS

| | | | |
|---|---|---|---|
| 4,001,946 A * | 1/1977 | Procopio ....................... 434/365 |
| 4,067,015 A * | 1/1978 | Mogavero et al. .......... 340/13.1 |
| 4,527,198 A | 7/1985 | Callahan |
| 5,023,709 A * | 6/1991 | Kita et al. ..................... 348/172 |
| 5,313,276 A * | 5/1994 | Taaffe .............................. 348/51 |
| 5,828,485 A * | 10/1998 | Hewlett ......................... 359/291 |
| 6,079,862 A | 6/2000 | Kawashima |
| 6,204,762 B1 * | 3/2001 | Dering et al. ................ 340/541 |
| 6,219,093 B1 * | 4/2001 | Perry ............................ 348/135 |
| 6,529,853 B1 * | 3/2003 | Bauer ........................... 702/152 |
| 6,532,191 B2 * | 3/2003 | LaRosa et al. ............... 367/124 |
| 6,919,916 B2 * | 7/2005 | Perry ............................ 348/135 |
| 7,084,761 B2 * | 8/2006 | Izumi et al. .................. 340/541 |
| 7,140,962 B2 * | 11/2006 | Okuda et al. .................... 463/2 |

(Continued)

OTHER PUBLICATIONS

Evolight, "Follow me", http://www.evolight.it/pagina_prodotti/linea-follow-me/follow-me.htm.

(Continued)

*Primary Examiner* — Christopher S Kelley
*Assistant Examiner* — Asmamaw G Tarko
(74) *Attorney, Agent, or Firm* — Farjami & Farjami LLP (57) ABSTRACT

There is provided a system and method for controlling a tracking device to follow a location of a performer on a stage. The tracking device may comprise a lighting fixture such as a high output video projector or an automated mechanical moving light such as a DMX lighting fixture to provide a followspot, or a microphone to record audio from a particular performer. The method comprises capturing a video feed of the stage using a camera, presenting the video feed on a display of a control device, receiving input data indicating a position of the performer in the video feed, translating the input data into the location of the performer on the stage, and adjusting the tracking device to follow the location of the performer on the stage. The control device thereby provides lighting operators with an intuitive interface readily implemented using cost effective commodity hardware.

20 Claims, 4 Drawing Sheets

(56) References Cited

U.S. PATENT DOCUMENTS

| | | | |
|---|---|---|---|
| 7,181,047 B2* | 2/2007 | Pirim | 382/107 |
| 7,227,893 B1* | 6/2007 | Srinivasa et al. | 375/240.08 |
| 7,242,152 B2* | 7/2007 | Dowling et al. | 315/291 |
| 7,327,253 B2* | 2/2008 | Whitten et al. | 340/541 |
| 7,483,049 B2* | 1/2009 | Aman et al. | 348/162 |
| 7,548,272 B2* | 6/2009 | Perlman et al. | 348/371 |
| 7,629,994 B2* | 12/2009 | Dobrin | 348/139 |
| 7,767,967 B2* | 8/2010 | Gordon et al. | 250/339.05 |
| 8,009,374 B2* | 8/2011 | Hewlett | 359/896 |
| 8,022,954 B2* | 9/2011 | Hewlett | 345/474 |
| 8,031,227 B2* | 10/2011 | Neal et al. | 348/169 |
| 8,125,529 B2* | 2/2012 | Skoskiewicz et al. | 348/211.2 |
| 8,164,643 B2* | 4/2012 | Yoshizumi et al. | 348/222.1 |
| 8,199,194 B2* | 6/2012 | Troy et al. | 348/94 |
| 8,248,473 B2* | 8/2012 | Graber | 348/153 |
| 2002/0176603 A1 | 11/2002 | Bauer et al. | |
| 2005/0126373 A1* | 6/2005 | Ludwig | 84/661 |
| 2005/0126374 A1* | 6/2005 | Ludwig | 84/661 |
| 2006/0197840 A1* | 9/2006 | Neal et al. | 348/169 |
| 2007/0051235 A1* | 3/2007 | Hawkes et al. | 89/37.04 |
| 2008/0013793 A1* | 1/2008 | Hillis et al. | 382/114 |
| 2008/0147350 A1* | 6/2008 | Jean | 702/150 |
| 2010/0026624 A1* | 2/2010 | Bell | 345/156 |
| 2010/0200753 A1* | 8/2010 | Westaway | 250/338.1 |
| 2010/0215214 A1* | 8/2010 | Pirim | 382/103 |
| 2011/0007157 A1* | 1/2011 | Sekelsky et al. | 348/143 |
| 2011/0117532 A1* | 5/2011 | Relyea et al. | 434/307 R |
| 2012/0057012 A1* | 3/2012 | Sitrick et al. | 348/77 |
| 2012/0062700 A1* | 3/2012 | Antonellis et al. | 348/43 |
| 2012/0140098 A1* | 6/2012 | Ryckman | 348/241 |
| 2012/0154593 A1* | 6/2012 | Anderson | 348/157 |
| 2012/0212630 A1* | 8/2012 | Pryor | 348/207.1 |
| 2012/0224068 A1* | 9/2012 | Sweet, III | 348/169 |
| 2012/0249797 A1* | 10/2012 | Haddick et al. | 348/158 |
| 2012/0249802 A1* | 10/2012 | Taylor | 348/169 |

OTHER PUBLICATIONS

YouTube, "Spotrack", http://www.youtube.com/watch?v=c56saAILkG8&feature=player_embedded.

* cited by examiner

SYSTEM AND METHOD FOR THEATRICAL FOLLOWSPOT CONTROL INTERFACE

BACKGROUND OF THE INVENTION

1. Field of the Invention

The present invention relates generally to presentation systems. More particularly, the present invention relates to control interfaces for presentation systems.

2. Background Art

Live performances such as theatre, concerts, shows, and other events are often enhanced with dynamic lighting effects. By targeting followspots or moving spotlights on specific actors or performers, audience attention can be more easily directed and focused. In particular, when a stage shares several performers or features elaborate prop design, several visual elements may compete for audience attention. Through the use of followspots, performer movement and other important stage actions can be more easily perceived, providing audiences with a more coherent and enjoyable presentation.

Conventionally, directional lighting fixtures are controlled in real-time to provide followspots for performers. For example, such lighting fixtures may be manually operated by lifting a lighting operator high into a hanging truss system or another remote location providing a vantage point for covering an entire stage. An obvious drawback of this method is that the operator must climb up or be carried into the remote position using a rigging system, and must remain at the remote location for the duration of the entire performance.

As a result, alternative methods have been developed where adjustable lighting fixtures such as moving head fixtures are controlled remotely using standard joysticks. However, such methods often require highly trained lighting operators as it is difficult to track performers without being in the same vantage point of the lighting fixtures. Moreover, control latency and stepper motor cogging of the moving head fixtures may produce unprofessional results due to delayed and non-linear motion of followspots, which may pose a particular problem for active and fast moving performers.

While advanced systems may exist for real time tracking of performers on a stage, these advanced systems are often complex, costly, and time consuming to setup. For example, one advanced system uses infrared and ultrasonic transducers placed on performers for real-time positional tracking, but requires significant calibration of the system for each venue. Thus, such advanced systems may be inappropriate for smaller venues and productions with limited budgets. Moreover, such systems may still experience negative effects from latency between performer movements and followspot motion.

Accordingly, there is a need to overcome the drawbacks and deficiencies in the art by providing a way to control presentation systems such as followspot lighting fixtures in a cost effective, low latency, and easy to operate manner.

SUMMARY OF THE INVENTION

There are provided systems and methods for theatrical followspot control interfaces, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for theatrical followspot control interfaces. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
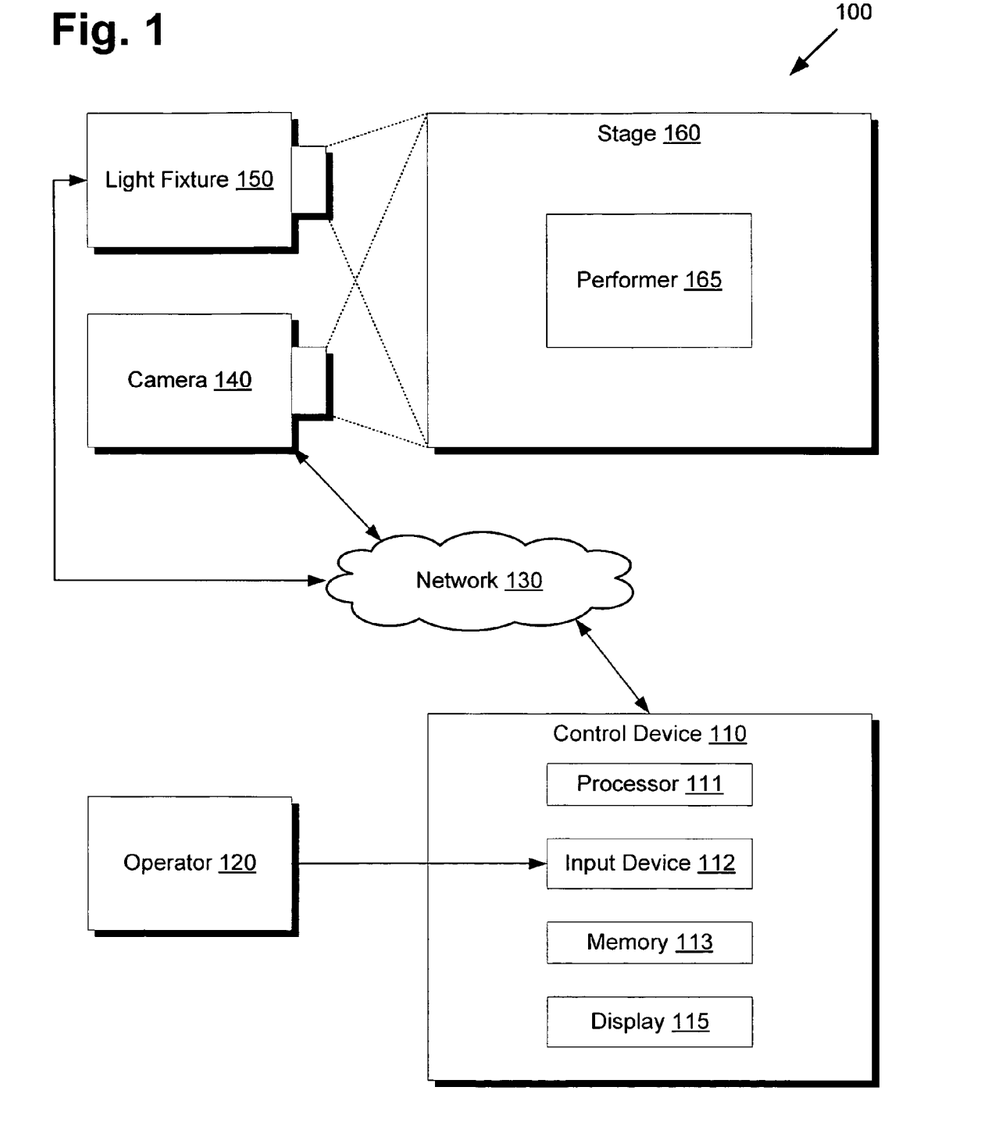
FIG. 1 presents a block diagram of a system for providing a theatrical followspot control interface, according to one embodiment of the present invention.

FIG. 1 presents a block diagram of a system for providing a theatrical followspot control interface, according to one embodiment of the present invention. Diagram 100 of FIG. 1 includes control device 110, operator 120, network 130, camera 140, light fixture 150, and stage 160. Control device 110 includes processor 111, input device 112, memory 113, and display 115. Stage 160 includes performer 165.

To prepare stage 160, light fixture 150 and camera 140 may be first positioned such that the majority of stage 160 can be illuminated by light fixture 150 and captured by camera 140. Light fixture 150 may comprise, for example, a high output video projector or a mechanically adjustable lighting fixture. Camera 140 may comprise, for example, a standard camera or an infrared camera. If an infrared camera is used, then stage 160 may be flooded with an infrared light source.

While light fixture 150 and camera 140 may be co-positioned to largely share the same point of view, this is not a requirement. For example, camera 140 may be placed overhead and in front of stage 160 to capture a frontal view of stage 160, whereas light fixture 150 may be placed centrally and directly overhead stage 160 to provide spotlights from above. Additionally, although only a single light fixture 150 and a single camera 140 is shown in FIG. 1 for simplicity, alternative embodiments may use several cameras or light fixtures.

Camera 140 may capture a video feed of stage 160, including performer 165, which may be streamed over network 130 to control device 110. Network 130 may for example comprise simple direct cable connections. For simplified network wiring, the video feed may be captured at a lower resolution to enable the use of simplified wiring such as video over CAT5 using passive baluns. Alternatively, wireless connections may be used. Depending on the capabilities of camera 140, which may comprise an inexpensive web camera or a professional grade video camera, the video feed may be captured in several different formats. Standard web camera resolutions may be utilized, such as 320 by 240 pixels, 640 by 480 pixels, 1024 by 768 pixels, or other suitable resolutions in various aspect ratios such as 4:3 and 16:9. Different frame rates may also be supported, such as 24, 30, or 60 frames per second. Higher frame rates may be helpful to support fast motion and low latency applications.

After receiving the video feed, control device 110 can present a user interface on display 115 to assist operator 120 in controlling light fixture 150. Control device 110 may comprise, for example, an all-in-one personal computer with an integrated display, a laptop computer, a tablet computer, or a similar device. Advantageously, control device 110 may therefore comprise an off-the-shelf computer, avoiding the requirement for specialized control hardware. The only proprietary component required is a custom software program to provide the user interface, which may be provided on separate media to be stored in memory 113. Input device 112 may comprise any conventional pointing device such as a mouse, a trackball, a touch sensitive screen, or a tablet digitizer. Display 115 may comprise, for example, an integrated or external LCD display. The user interface may, for example, show the video feed received from camera 140, allowing operator 120 to use input device 112 to, for example, trace the movement of performer 165 in the video feed using an on-screen pointer or by using touch or pen input.

After receiving such input data from input device 112, processor 111 of control device 110 can determine how to control light fixture 150 to create a followspot for performer 165 on stage 160. For example, if light fixture 150 is a video projector, then an image to project may be generated and transmitted via network 130 to light fixture 150. Advantageously, if a video projector is used, then latency associated with mechanical movements is eliminated since the image to project may be changed almost instantaneously. If light fixture 150 instead comprises a mechanically adjustable light fixture, then commands for panning, tilting, dimming, tinting, and other changes may be issued to light fixture 150 via network 130. In this manner, a flexibly controllable followspot may be provided that follows the movements of performer 165.

Figure 2:
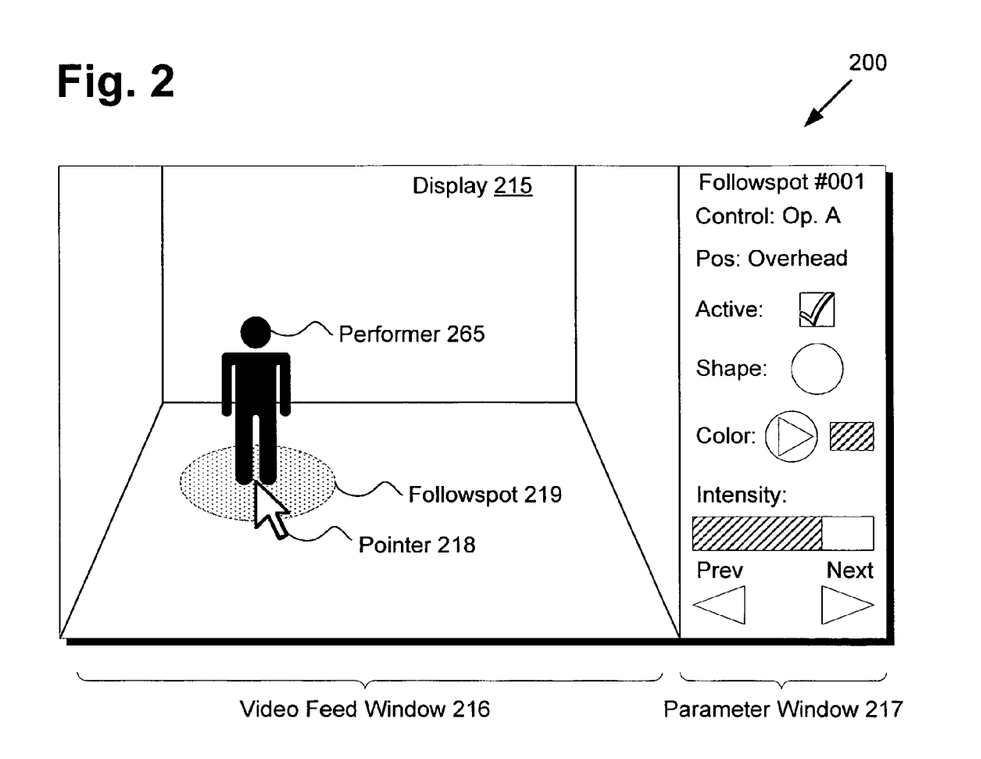
FIG. 2 presents a display showing a theatrical followspot control interface, according to one embodiment of the present invention.

Moving to FIG. 2, FIG. 2 presents a display showing a theatrical followspot control interface, according to one embodiment of the present invention. Diagram 200 of FIG. 2 includes display 215, which includes video feed window 216 and parameter window 217. Video feed window 216 includes pointer 218, followspot 219, and performer 265. Display 215 corresponds to display 115 of FIG. 1. Performer 265 corresponds to performer 165 of FIG. 1.

Display 215 shows an exemplary user interface that may be used by light control operators, such as operator 120 in FIG. 1. The interface depicted in display 215 allows the control of a single followspot, but alternative embodiments may allow multiple followspots to be controlled concurrently, for example by using a multi-touch capable display. Additionally, multiple operators may each control one or more followspots to accommodate large numbers of followspots.

As shown in display 215, video feed window 216 shows a video feed, which may for example be captured from camera 140 in FIG. 1. As previously discussed, camera 140 may comprise an infrared camera where stage 160 is illuminated with infrared light, in which case performer 265 is advantageously visible in video feed window 216 even if stage 160 is dark or with little visible light. Thus, the lighting operator can calibrate to the position of performer 265 regardless of visible lighting conditions, which may be particularly useful for the beginning of a performance when stage 160 may remain dark.

As shown in parameter window 217, the operator may set and modify various followspot parameters. As shown at the top of parameter window 217, information concerning the presently selected followspot may be provided, such as an identifier number or "Followspot #001", an assigned control operator or "Op. A", and a position of the lighting source as being "Overhead". As previously described, multiple light fixtures may be placed around the stage to support multiple followspots, and multiple control operators may be assigned to these multiple light fixtures. Following this information, the operator may select whether the followspot is active or turned on, the shape of the followspot, the color or hue of the followspot, the intensity or brightness of the followspot, and controls to switch to other controllable followspots, if applicable. The controls in parameter window 217 may, for example, be mapped to alternative input devices such as a keyboard or a joystick to allow the primary input device to focus on controlling pointer 218. It should be noted that the parameters shown in parameter window 217 are exemplary and alternative embodiments may include different control parameters to best suit the needs of the particular venue.

After configuring parameter window 217, the operator can focus on controlling pointer 218 to follow the movements of performer 265 in video feed window 216. In one embodiment, the movement of followspot 219 may simply follow pointer 218 directly, where operator 120 manually controls pointer 218 by input device 112. Automatic curve and movement smoothing may be applied to pointer movement to avoid sudden or stuttering movements of followspot 219. In alternative embodiments, the operator may merely direct pointer 218 to an initial position of performer 265, and image analysis techniques such as edge and object detection may be applied to the video feed to automatically detect the position of performer 265 in the video feed. Optionally, motion sensors such as moving field detection equipment may also be placed on the stage to further assist lighting operators in locating performer 265.

Figure 3:
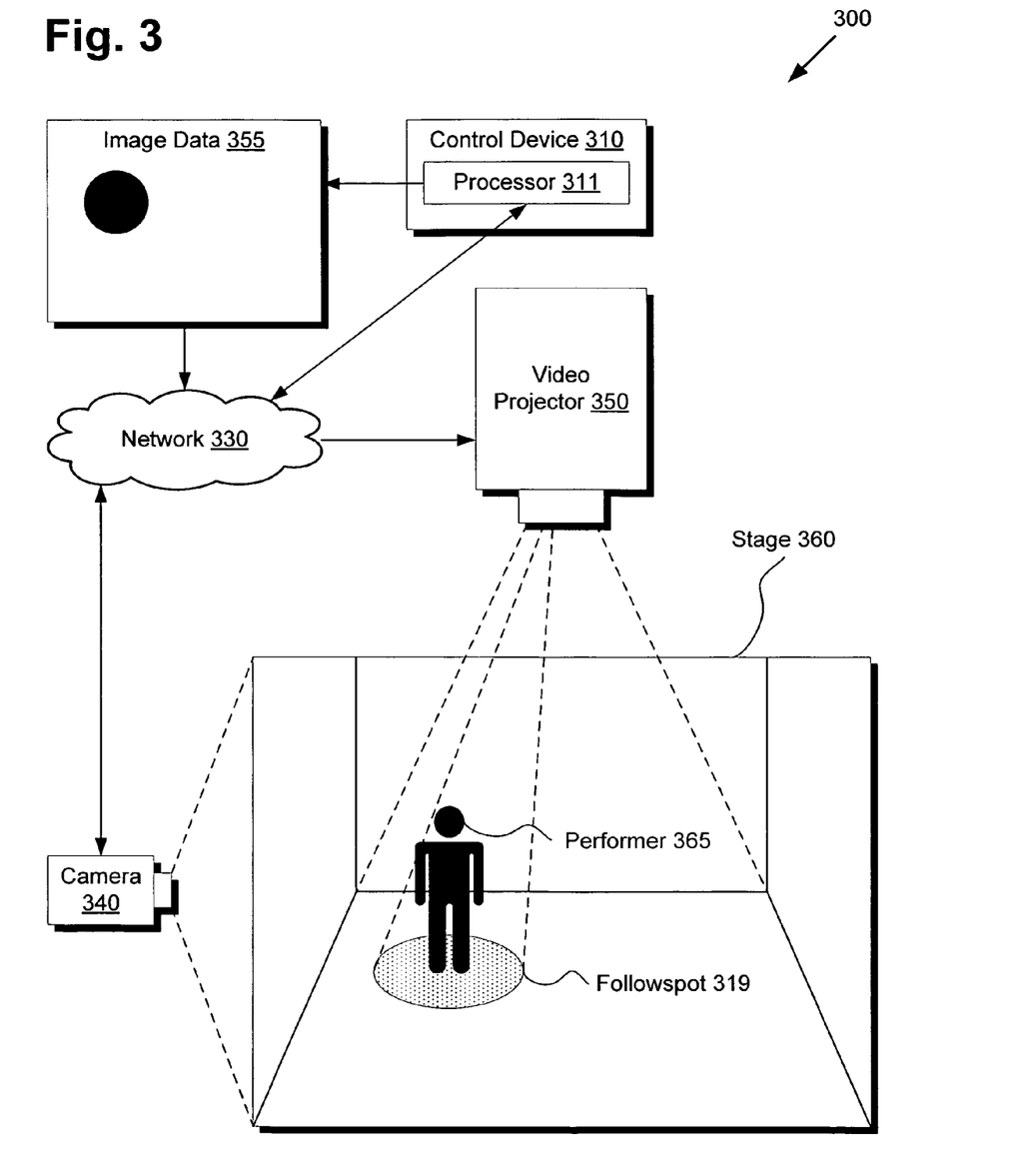
FIG. 3 presents a block diagram of a system implementing theatrical followspots using a theatrical followspot control interface, according to one embodiment of the present invention.

Moving to FIG. 3, FIG. 3 presents a block diagram of a system implementing theatrical followspots using a theatrical followspot control interface, according to one embodiment of the present invention. Diagram 300 of FIG. 3 includes control device 310, network 330, camera 340, video projector 350, image data 355, and stage 360. Control device 310 includes processor 311. Stage 360 includes followspot 319 and performer 365. Control device 310 corresponds to control device 110 from FIG. 1, network 330 corresponds to network 130 from FIG. 1, camera 340 corresponds to camera 140 from FIG. 1, video projector 350 corresponds to light fixture 150 from FIG. 1, and stage 360 corresponds to stage 160 from FIG. 1. Followspot 319 corresponds to followspot 219 from FIG. 2, and performer 365 corresponds to performer 265 from FIG. 2.

As shown in FIG. 3, video projector 350 is used as the lighting fixture, which is positioned directly overhead stage 360. After the operator indicates the position of performer 365 in the video feed captured from camera 340, processor 311 can generate image data 355 to be projected by video projector 350. For example, the two-dimensional X and Y coordinates provided by the pointer location indicated by the operator can be translated into virtual three-dimensional X, Y and Z coordinates corresponding to the pointer location within a virtualized simulation of stage 360. By taking into account the position of video projector 350 and camera 340 and by calibrating the projector output, for example by projecting a test pattern to be captured by camera 340, the virtual three-dimensional coordinates can be mapped into a two-dimensional image, or image data 355, that can be projected by video projector 350 to create the appearance of followspot 319. As shown in image data 355, since the shape of the followspot is a circle, the image comprises a filled circle at the appropriate position with the remainder of the image as blank or black. After image data 355 is sent over network 330 and loaded into video projector 350, image data 355 can then be projected onto stage 360 to form followspot 319. Since the operator of control device 310 can continuously move a pointer in synchronization with the movements of performer 365, continuously updated image data 355 can be provided to video projector 350 so that followspot 319 can follow the movements of performer 365.

As previously described, since video projector 350 can change updated image data almost instantaneously, movement latency may be advantageously eliminated compared to conventional mechanical lighting fixtures. However, alternative embodiments may still utilize mechanical lighting fixtures, for example if high output video projectors are unavailable for a particular application. Thus, rather than generating image data 355, processor 311 could instead generate adjustment parameters for pan, tilt, intensity and color tint, which could then be sent over network 330 to an associated mechanically adjustable lighting fixture such as a DMX lighting fixture to move followspot 319 in accordance with operator directions.

Furthermore, while the embodiments discussed have focused on the control of lighting fixtures to follow a performer on stage, alternative embodiments may control other devices as well. For example, control device 310 may be used to physically move an overhead microphone to the position of performer 365 on stage 360. If a microphone array is used, then the microphone array may instead be steered towards the position of performer 365 on stage 360. Furthermore, control device 310 may also be connected with an audio mixer system for stage 360. This may, for example, allow a sound operator to isolate or emphasize particular performer voices at specific times, which may be particular useful if several performers are on stage 360. Thus, events with multiple speakers or audience participation such as debates, game shows, award shows, and other events may be more easily moderated.

Figure 4:
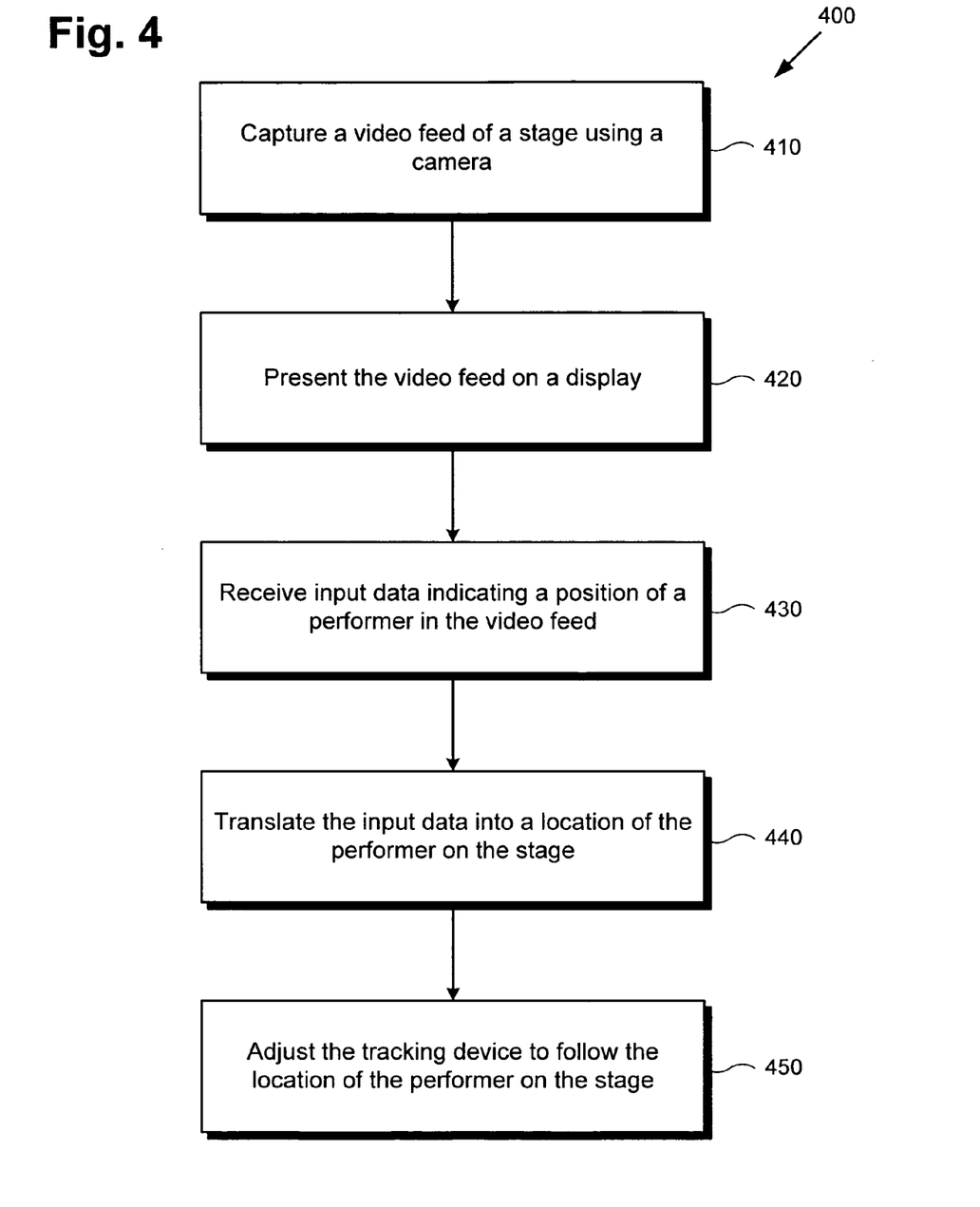
FIG. 4 shows a flowchart describing the steps, according to one embodiment of the present invention, by which a control device may provide a user interface for controlling a tracking device to follow a location of a performer on a stage.

Moving to FIG. 4, FIG. 4 shows a flowchart describing the steps, according to one embodiment of the present invention, by which a control device may provide a user interface for controlling a tracking device to follow a location of a performer on a stage. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4 and diagram 100 of FIG. 1, step 410 of flowchart 400 comprises processor 111 of control device 110 capturing a video feed of stage 160 using camera 140. As previously described, camera 140 may comprise an infrared camera in which case stage 160 may be flooded with infrared illumination. Camera 140 may be configured to continuously capture a video feed of stage 160, which can then be streamed over network 130 to control device 110. As previously described, the capture resolution may be reduced to limit the required bandwidth, permitting the use of simplified passive wiring or wireless transmission. Camera 140 may also apply real-time compression to further reduce bandwidth requirements. A process thread executing on processor 111 may then receive and decode the video feed streamed over network 130.

Referring to step 420 of flowchart 400 in FIG. 4 and diagram 100 of FIG. 1, step 420 of flowchart 400 comprises processor 111 of control device 110 presenting the video feed from step 410 on display 115. As previously described, display 115 may comprise an internal or external LCD display. For example, referring to an example interface shown by display 215 of FIG. 2, the video feed may appear in video feed window 216. As previously noted, if an infrared camera is used in step 410, then performer 265 will be visible in the video feed even in low light conditions. Thus, the operator may calibrate the position of pointer 218 and thus followspot 219 even in complete darkness, which may be particularly useful prior to the start of a performance.

Referring to step 430 of flowchart 400 in FIG. 4, diagram 100 of FIG. 1, and diagram 200 of FIG. 2, step 430 of flowchart 400 comprises processor 111 of control device 110 receiving input data indicating a position of performer 265 in the video feed shown in video feed window 216 of display 215. As previously described, operator 120 may use input device 112 comprising a mouse, a trackball, a touch sensitive screen, or a tablet digitizer. Input data received from input device 112 may then be translated by processor 111 into movement of pointer 218 such that operator 120 can follow performer 265 as the position of performer 265 moves during a performance. As previously described, automatic movement smoothing, image analysis and motion field detectors may be utilized to assist the operator in following performer 265 with greater accuracy.

Referring to step 440 of flowchart 400 in FIG. 4 and diagram 300 of FIG. 3, step 440 of flowchart 400 comprises processor 311 of control device 310 translating the input data from step 430 into a location of performer 365 on stage 360. Control device 310 and processor 311 corresponds to control device 110 and processor 111 of FIG. 1. As previously described, a virtual three-dimensional simulation of stage 360 may be calculated by processor 311, and the two-dimensional position of pointer 218 in FIG. 2 may be translated into a three-dimensional coordinate within the virtual three-dimensional simulation. In this manner, the location of performer 365 can be represented within a virtual simulation corresponding to the actual stage 360.

Referring to step 450 of flowchart 400 in FIG. 4 and diagram 300 of FIG. 3, step 450 of flowchart 400 comprises processor 311 of control device 310 adjusting video projector 350 to follow the location of performer 365 on stage 360 translated from step 440. While the example shown in FIG. 3 uses video projector 350 as the tracking device, the tracking device may also comprise a mechanically adjustable lighting fixture, a transportable microphone, a microphone array, or any other tracking device for following performers on a stage.

In the example shown in FIG. 3, processor 311 carries out step 450 by generating image data 355 for projection by video projector 350 to create followspot 319 following the location of performer 365 on stage 360. The characteristics of video projector 350 may be programmed into the virtual simulation, thereby allowing the correct calculation of image data 355. For example, the surface area of stage 360 illuminated by video projector 350 may be calibrated and mapped into the virtual simulation, and the translated three-dimensional coordinate from step 440 may then be converted into two-dimensional image data 355 based on how video projector 350 projects onto stage 360 and the selected followspot parameters in parameter window 217 of FIG. 2. Thus, processor 311 can calculate an appropriate image, or a circular followspot with the chosen color and intensity, based on the position and configuration of video projector 350 so that image data 355 projected by video projector 350 appears as followspot 319 on performer 365.

By continuously repeating steps 410 through 450 during a performance, the movements of performer 365 can be tracked on stage 360 and followspot 319 can be controlled to synchronously follow performer 365. As previously described, the system can be scaled to several tracking devices and several cameras controlled by several operators, allowing multiple performers to be tracked with multiple tracking devices. The use of high-output video projectors rather than mechanically controlled lighting fixtures may help eliminate mechanical latency, providing followspots that can readily synchronize with even the fastest moving performers. By using appropriate tracking devices such as video projectors and microphones, lighting, sound, and other stage elements may be manipulated in real-time to provide a focused and professional stage presentation that is easy and enjoyable for audiences to follow.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of controlling a tracking device to follow a location of a performer on a stage, the method comprising:
    capturing a video feed of the stage using a camera;
    presenting a user interface showing the video feed on a display of a control device, wherein the user interface is used by an operator to control the tracking device;
    receiving input data from the operator using the user interface to indicate a position of the performer in the video feed;
    translating the input data into the location of the performer on the stage; and
    adjusting the tracking device to follow the location of the performer on the stage.

2. The method of claim 1, wherein the tracking device comprises a video projector, and wherein the adjusting comprises modifying an image projected by the video projector to form a spotlight on the location of the performer on the stage.

3. The method of claim 1, wherein the tracking device comprises a mechanically adjustable lighting fixture, and wherein the adjusting comprises mechanically directing the lighting fixture to the location of the performer on the stage.

4. The method of claim 1, wherein the tracking device comprises a microphone, and wherein the adjusting comprises moving the microphone to the location of the performer on the stage.

5. The method of claim 1, wherein the tracking device comprises a microphone array, and wherein the adjusting comprises steering the microphone array to the location of the performer on the stage.

6. The method of claim 1, wherein the camera comprises an infrared camera, and wherein the stage is illuminated with an infrared light source.

7. The method of claim 1, wherein the input data is received from an input peripheral of the control device selected from the group comprising a touch sensitive display, a tablet digitizer, a mouse, or a trackball.

8. The method of claim 1, wherein the input data is further received from a motion sensor detecting movement of the performer on the stage.

9. The method of claim 1, wherein the input data is further received from image analysis of the video feed.

10. The method of claim 1, wherein the translating is by converting two-dimensional coordinates of the input data into three-dimensional coordinates of a virtual environment corresponding to the stage.

11. A system for controlling a tracking device to follow a location of a performer on a stage, the system comprising:
    a camera configured to capture a video feed of the stage; and
    a control device having a processor configured to:
        present a user interface showing the video feed on a display, wherein the user interface is used by an operator to control the tracking device;
        receive input data from the operator using the user interface to indicate a position of the performer in the video feed;
        translate the input data into the location of the performer on the stage; and
        adjust the tracking device to follow the location of the performer on the stage.

12. The system of claim 11, wherein the tracking device comprises a video projector, and wherein the processor is further configured to adjust by modifying an image projected by the video projector to form a spotlight on the location of the performer on the stage.

13. The system of claim 11, wherein the tracking device comprises a mechanically adjustable lighting fixture, and wherein the processor is further configured to adjust by mechanically directing the lighting fixture to the location of the performer on the stage.

14. The system of claim 11, wherein the tracking device comprises a microphone, and wherein the processor is further configured to adjust by moving the microphone to the location of the performer on the stage.

15. The system of claim 11, wherein the tracking device comprises a microphone array, and wherein the processor is further configured to adjust by steering the microphone array to the location of the performer on the stage.

16. The system of claim 11, further comprising an infrared light source illuminating the stage, and wherein the camera comprises an infrared camera.

17. The system of claim 11, further comprising an input peripheral connected to the control device selected from the group comprising a touch sensitive display, a tablet digitizer, a mouse, or a trackball, and wherein the processor is further configured to receive the input data from the input peripheral.

18. The system of claim 11, further comprising a motion sensor detecting movement of the performer on the stage, and wherein the processor is further configured to receive the input data from the motion sensor.

19. The system of claim 11, wherein the processor is further configured to receive the input data by performing image analysis of the video feed.

20. The system of claim 11, wherein the processor is further configured to translate by converting two-dimensional coordinates of the input data into three-dimensional coordinates of a virtual environment corresponding to the stage.

* * * * *